(12) United States Patent
Li

(10) Patent No.: US 10,541,542 B2
(45) Date of Patent: Jan. 21, 2020

(54) SYSTEM AND METHOD FOR CHARGING A BATTERY PACK

(71) Applicant: O2Micro Inc., Santa Clara, CA (US)

(72) Inventor: Guoxing Li, Sunnyvale, CA (US)

(73) Assignee: O2MICRO INC., Santa Clara, CA (US)

( * ) Notice: Subject to any disclaimer, the term of this patent is extended or adjusted under 35 U.S.C. 154(b) by 274 days.

(21) Appl. No.: 15/282,318

(22) Filed: Sep. 30, 2016

(65) Prior Publication Data
US 2018/0097372 A1   Apr. 5, 2018

(51) Int. Cl.
*H02J 7/00* (2006.01)

(52) U.S. Cl.
CPC .......... *H02J 7/0021* (2013.01); *H02J 7/0068* (2013.01); *H02J 2007/0096* (2013.01)

(58) Field of Classification Search
CPC ........ H02J 7/007; H02J 7/0047; H02J 7/0068; H02J 7/0021; H02J 2007/0096; H02J 7/0019; H02J 2007/005; H02J 7/0008; H02J 50/80; H02J 7/0011; H02J 7/0014; H02J 7/027
USPC .......................... 320/112, 128, 132, 137, 152
See application file for complete search history.

(56) References Cited

U.S. PATENT DOCUMENTS

| | | | | |
|---|---|---|---|---|
| 8,183,832 B2 * | 5/2012 | Otsu | ................... | H01M 10/052 320/116 |
| 8,212,375 B2 | 7/2012 | Paulsen et al. | | |
| 2011/0313613 A1 * | 12/2011 | Kawahara | ........... | H01M 10/441 701/34.4 |
| 2014/0266072 A1 * | 9/2014 | Gong | .................... | H02J 7/0016 320/164 |
| 2014/0306660 A1 * | 10/2014 | Suzuki | .................. | H02J 7/0045 320/110 |
| 2014/0327400 A1 * | 11/2014 | Kudo | .................... | H02J 7/0016 320/118 |
| 2015/0295441 A1 * | 10/2015 | Winger | ................. | H02J 7/0052 320/107 |
| 2015/0377976 A1 * | 12/2015 | Maluf | ................... | H02J 7/0047 702/63 |

OTHER PUBLICATIONS

Battery Management Guide from Texas Instruments Incorporated.
Complete battery-pack design for one or two cell portable applications from Texas Instruments Incorporated.

* cited by examiner

*Primary Examiner* — Nghia M Doan

(57) ABSTRACT

A battery pack receives a charging current from a charger via a power line. The battery pack includes a battery management unit and a transmitting unit. The battery management unit is coupled to a plurality of battery cells and is operable for acquiring data associated with the battery pack. The transmitting unit is coupled to the battery management unit and is operable for transmitting the data to the charger via a power line.

5 Claims, 4 Drawing Sheets

SYSTEM AND METHOD FOR CHARGING A BATTERY PACK

BACKGROUND

FIG. 1 shows a conventional charging system 100 which includes a charger 102 for charging a battery pack 104. The battery pack 104 includes a charging switch 112, a discharging switch 114, and a battery management unit 116. The battery management unit 116 monitors multiple battery cells and controls the charging switch 112 and the discharging switch 114. If a safety event such as over-voltage, over-current, over-temperature, or short-circuit occurs in the battery pack 104 during a charging process, the battery management unit 116 turns off the charging switch 112 to stop charging of the battery pack 104. The charger 102 includes a power unit 106 for providing a charging power and a charger controller 108 for controlling the charger 102. The charger 102 also includes a charging switch 110 which is controlled by the charger controller 108. The charging switch 110 is turned off when the end of charge (EOC) condition is met.

In FIG. 1, the charging switch 112 is usually implemented by a power metal-oxide-semiconductor field-effect transistor (MOSFET) which is relatively large and expensive. Thus, it occupies more printed circuit board (PCB) space and increases cost. It also increases the power loss from charging and discharging because of its drain-to-source on-state resistance (Rdson). In discharge mode, even though the charging switch 112 does not perform any function, it still dissipates power. Usually the discharging current is much higher than the charging current, and so the charging switch dissipates a significant amount of power unnecessarily in discharge mode. Furthermore, although not shown in FIG. 1, driver circuitry is needed to drive the charging switch 112. The driver circuitry itself dissipates power even if the battery pack 104 is in a sleep mode or an idle mode. Also, the charging switch 112 may be damaged at the startup of the discharge mode, when a large discharging current is going through an internal body diode of the charging switch 112. This is a factor which makes the charging system 100 unreliable.

SUMMARY

Embodiments in accordance with the present invention provide systems and methods for charging a battery pack.

In an embodiment, a battery pack receives a charging current from a charger via a power line. The battery pack includes a battery management unit and a transmitting unit. The battery management unit is coupled to a plurality of battery cells and is operable for acquiring data associated with the battery pack. The transmitting unit is coupled to the battery management unit and is operable for transmitting the data to the charger via a power line.

In another embodiment, an electronic system includes a charger operable for providing a charging current via a power line to a battery pack. The charger includes a receiving unit coupled to the power line and a charger controller coupled to the receiving unit. The receiving unit is operable for receiving and detecting patterns of variations (variation patterns) in the charging current and for retrieving data embodied in the variation patterns transmitted from the battery pack via the power line. The charger controller is operable for controlling the charger based on the data.

In yet another embodiment, a method for charging a battery pack includes: providing a charging current from a charger via a power line to the battery pack; acquiring data associated with the battery pack; transmitting the data from the battery pack to the charger via the power line; receiving the data by the charger; and controlling the charger based on the data.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
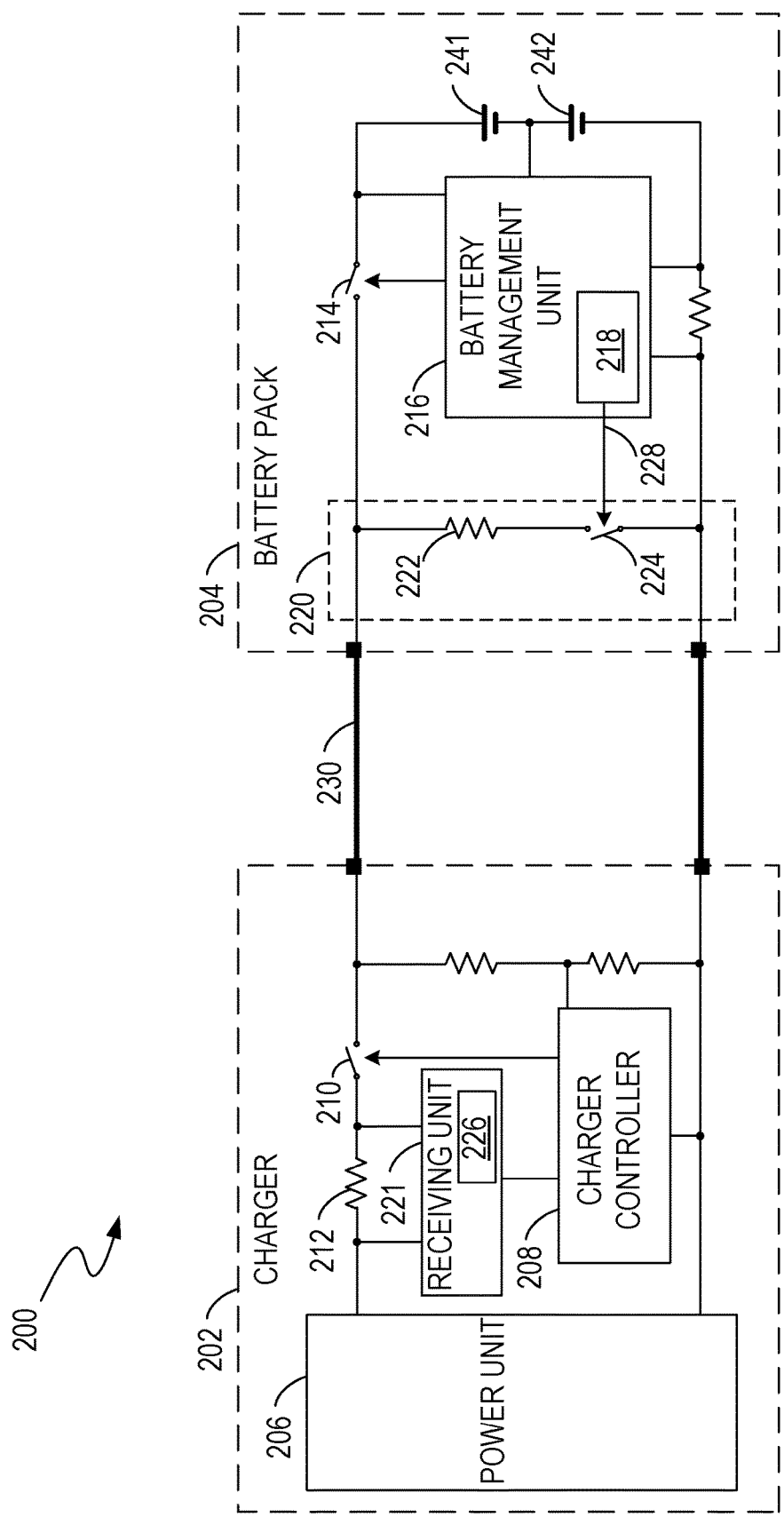
FIG. 2 shows a charging system, in accordance with an embodiment of the present invention.

FIG. 2 shows a charging system 200, in accordance with an embodiment of the present invention. The charging system 200 includes a charger 202 and a battery pack 204. The charger 202 is operable for providing a charging current via a power line 230 to the battery pack 204.

The battery pack 204 includes a battery management unit 216, a discharging switch 214, and a transmitting unit 220. The battery management unit 216 is coupled to multiple battery cells (e.g., the battery cells 241 and 242) and is operable for managing the battery cells. For example, the battery management unit 216 is operable for performing balance control of the battery cells during a charging state or mode and controlling the discharging switch 214 during a discharging state or mode. Furthermore, the battery management unit 216 is operable for monitoring the status of the battery cells and acquiring data associated with the battery pack 204. Such data can be, but not limited to, voltage, current, temperature, and state of charge (SOC) of each individual battery cell or the battery pack. Such data can also indicate various events that have occurred in the battery pack such as over-voltage, under-voltage, over-current, over-temperature, short-circuit, unbalanced cells, etc. The transmitting unit 220 is coupled to the battery management unit 216 and is operable for transmitting the data to the charger 202 via the power line 230. Receiving the data, the charger 202 is operable for adjusting charging parameters or taking protection actions accordingly. Adjusting the charging parameters can be, but not limited to, adjusting the charging current, charging voltage, or charging time, or stopping the charging output.

In an embodiment, the transmitting unit 220 includes a switch 224 coupled to the power line 230 through a resistor 222. The battery management unit 216 includes a signal generator 218 operable for generating a control signal 228 to control the transmitting unit 220 based on the aforementioned data. More specifically, the control signal 228 can have a first state, e.g., logic high, to turn on the switch 224 and a second state, e.g., logic low, to turn off the switch 224.

When the switch 224 is turned on, a current is enabled to flow from the power line 230 through the resistor 222 and the switch 224. Accordingly, in response to the turn-on of the switch 224, the charger 202 increases the charging current at its output to meet the increased demand for current. When the switch 224 is turned off, the current flowing from the power line 230 through the resistor 222 and the switch 224 is disabled. Accordingly, the charger 202 decreases the charging current at its output. Thus, by controlling the switch 224, the transmitting unit 220 is operable for varying an amplitude of the charging current, thus creating variations in the charging current that have different patterns (referred to hereinafter as variation patterns) based on the data. In an embodiment, these variation patterns can be composed of current pulses which possess a duty cycle or a frequency. The data, which is embodied in these variation patterns, is transmitted from the battery pack 204 to the charger 202 via the power line 230.

The charger 202 includes a power unit 206 for providing a charging power, a charger controller 208 for controlling the charger 202, and a charging switch 210 controlled by the charger controller 208. The charger 202 further includes a sensor 212 coupled to the power line 230 for sensing the charging current, and a receiving unit 221 coupled to the power line through the sensor 212. By monitoring the charging current, the receiving unit 221 is operable for receiving and sensing or detecting the variation patterns in the charging current and retrieving data based on the variation patterns, as described below. In an embodiment, the receiving unit 221 includes a pattern database 226 that stores multiple pre-defined patterns, each corresponding to specific data. The receiving unit 221 is operable for comparing the variation patterns in the charging current with the pre-defined patterns to retrieve the data transmitted from the battery pack 204 via the power line 230. The charger controller 208 is coupled to the receiving unit 208 and is operable for controlling the charger 202 based on the data.

In an embodiment, the pattern database 226 includes a first pre-defined pattern T1. Data corresponding to pattern T1 indicates that the battery pack 204 is in an over-temperature status. In operation, if the battery pack 204 is in an over-temperature status, then the battery management unit 216 (which monitors the status of the battery pack as described above) opens and closes the switch 224 in a particular pattern uniquely associated with that status. This in turn creates a particular variation pattern in the charging current that is also unique to that status. The receiving unit 221 receives (senses or detects) the variation pattern in the charging current and matches that pattern to the first pre-defined pattern T1. In this manner, data corresponding to pattern T1 is retrieved and is used to identify the presence of the over-temperature status. Accordingly, the charger controller 208 turns off the charging switch 210 to stop the charging.

In a second embodiment, the pattern database 226 includes a second pre-defined pattern T2. Data corresponding to pattern T2 indicates that the temperature of the battery pack 204 is above a threshold. In operation, if the temperature of the battery pack 204 is over a threshold, then the battery management unit 216 opens and closes the switch 224 in a particular pattern uniquely associated with that status. This in turn creates a particular variation pattern in the charging current that is also unique to that status. The receiving unit 221 receives (senses or detects) the variation pattern in the charging current and matches that pattern to the second pre-defined pattern T2. In this manner, data corresponding to pattern T2 is retrieved and is used to identify that the temperature of the battery pack is above a threshold. Accordingly, the charger controller 208 adjusts the charging current to a lower level in order to decrease the battery pack temperature.

In a third embodiment, the pattern database 226 includes a third pre-defined pattern T3. Data corresponding to pattern T3 indicates that the temperature of the battery pack 204 is below a threshold. In operation, if the temperature of the battery pack 204 is below a threshold, then the battery management unit 216 opens and closes the switch 224 in a particular pattern uniquely associated with that status. This in turn creates a particular variation pattern in the charging current that is also unique to that status. The receiving unit 221 receives the (senses or detects) variation pattern in the charging current and matches that pattern to the third pre-defined pattern T3. In this manner, data corresponding to pattern T3 is retrieved and is used to identify that the temperature of the battery pack is below a threshold. Accordingly, the charger controller 208 adjusts the charging current to a higher level to speed up the charging process.

Other statuses, such as those mentioned above, can be identified in a similar manner, and the various embodiments just described can be combined.

Figure 1:
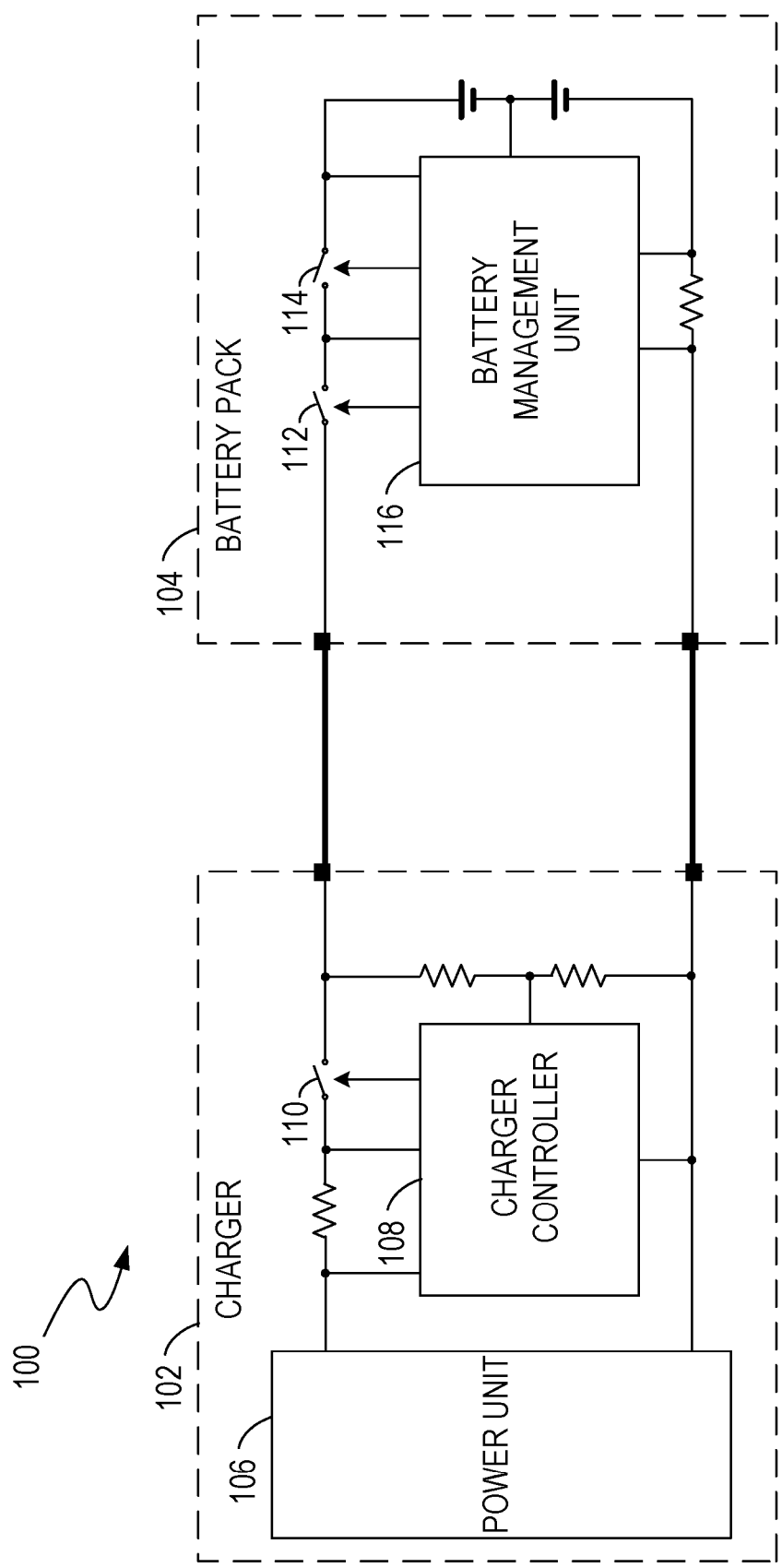
FIG. 1 shows a conventional charging system.

As described above, utilizing the transmitting unit 220, the battery pack 204 is operable for transmitting data to the charger 202 via the power line 230. Utilizing the receiving unit 221, the charger 202 is operable for retrieving the data and performing corresponding actions to control the charging process. Advantageously, a simple and low-cost solution to communicate between the charger and the battery is provided. Compared with the conventional charging system 100 in FIG. 1, the expensive and large-size charging switch in the battery pack can be eliminated. With the communication between the charger and the battery, the battery pack can be fully and safely charged, and the power loss is reduced. For example, if both charging switch 112 and discharging switch 114 in FIG. 1 have the same drain-to-source on-state resistance Rdson, the total power loss will be $2*I^2*Rdson$, where I is the current flowing through the charging switch 112 and the discharging switch 114. According to the present invention, the conventional charging switch in the battery pack is eliminated while its function is taken over by the charging switch 210 in the charger, and thus the total power loss in the battery pack side can be reduced by half.

Figure 3:
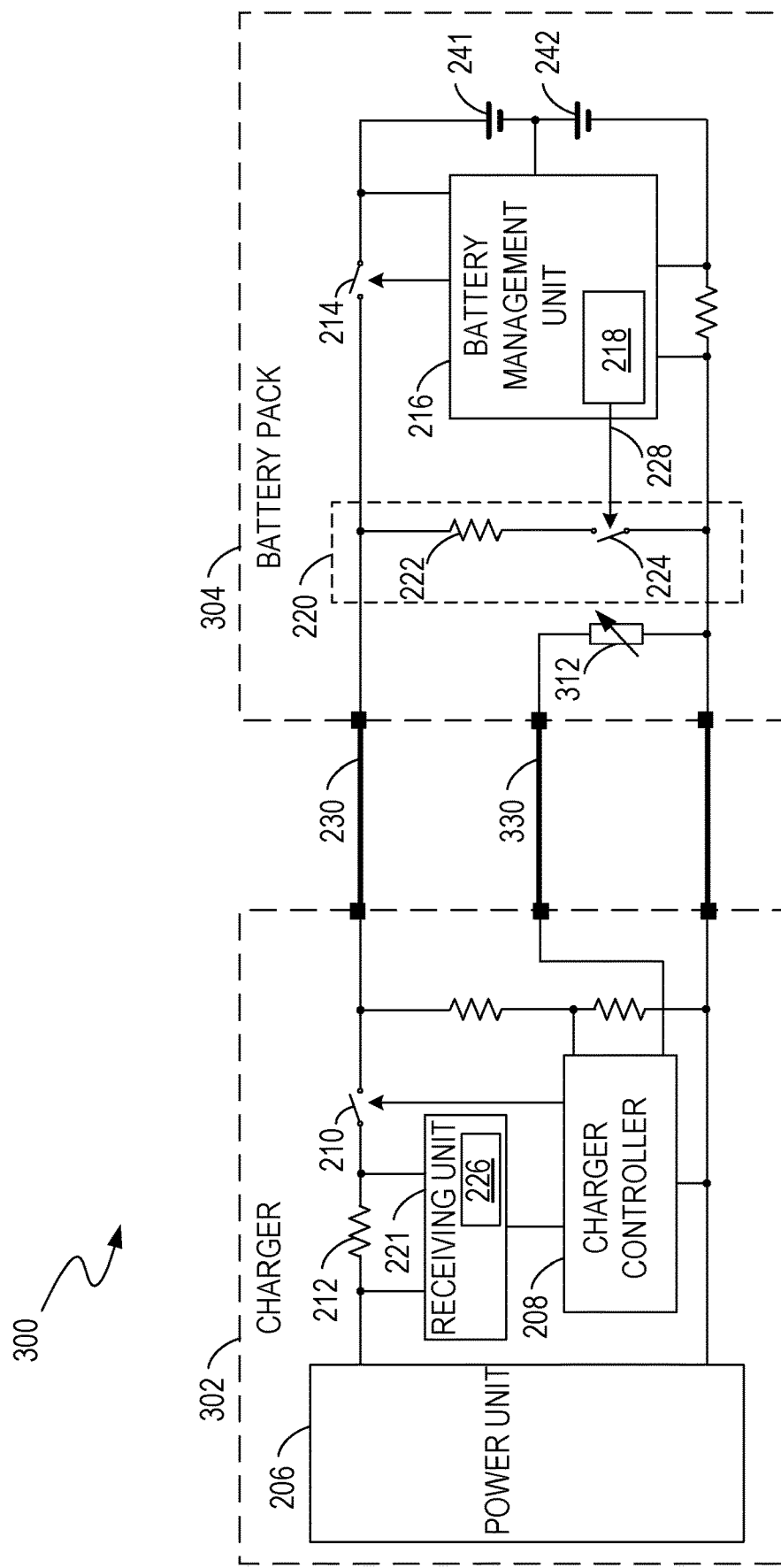
FIG. 3 shows a charging system, in accordance with another embodiment of the present invention.

FIG. 3 shows a charging system 300, in accordance with an embodiment of the present invention. Elements labeled the same as in FIG. 2 have similar functions.

The charging system 300 includes a charger 302 for charging a battery pack 304. In addition to the power line 230, the charging system 300 includes a communication line 330 coupled between the charger 302 and the battery pack 304. For example, the communication line 330 can be a data line in a universal serial bus (USB) cable. In the charger 302, the charger controller 208 is coupled to the communication line 330. The battery pack 304 includes a temperature sensor, e.g., a negative temperature coefficient thermistor 312 coupled to the communication line 330. A resistance of the thermistor 312 and a voltage across the thermistor 312 change with the temperature. In an embodiment, the thermistor 312 senses temperature and transmits the temperature data to the charger 302 via the communication line 330 by adjusting a voltage at the communication line 330. The charger 302 obtains the temperature data by monitoring the voltage at the communication line 330. In another embodiment, the temperature data is converted to a variation pattern in the charging current by the transmitting unit 220 and is transmitted to the charger 302 via the power line 230. The charger 302 obtains the temperature data by monitoring the variation of the charging current over the power line 230.

Figure 4:
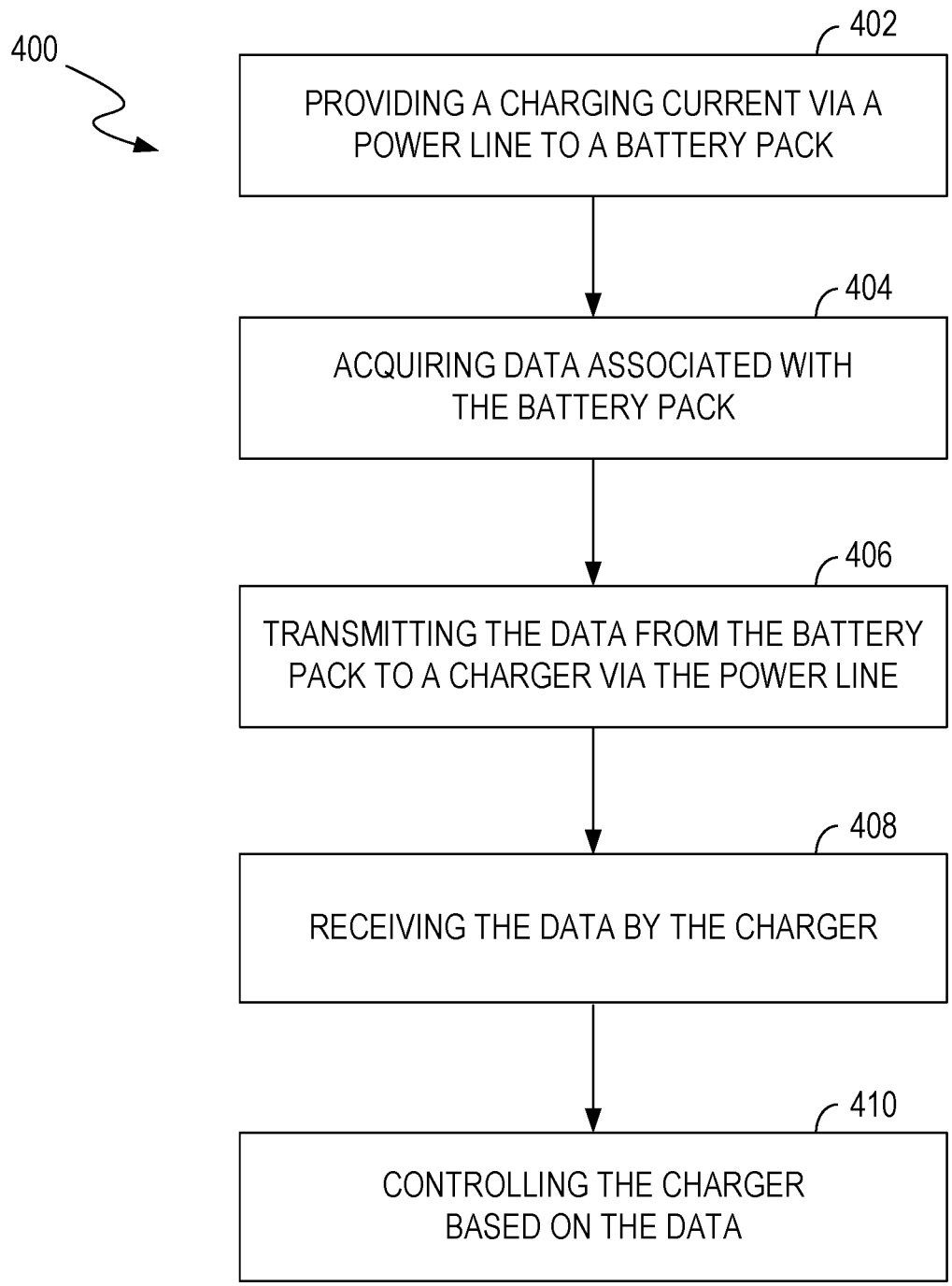
FIG. 4 shows a flowchart of a method for charging a battery pack, in accordance with an embodiment of the present invention.

FIG. 4 shows a flowchart 400 of a method for charging a battery pack, in accordance with an embodiment of the present invention. FIG. 4 is described in combination with FIG. 2.

In block 402, a charger 202 provides a charging current via a power line 230 to a battery pack 204.

In block 404, a battery management unit 216 in the battery pack 204 acquires data associated with the battery pack 404.

In block 406, the data is transmitted by a transmitting unit 220 in the battery pack 204 to the charger 202 via the power line 230. In an embodiment, in order to transmit the data, a switch 224 in the battery pack 204 is controlled to vary an amplitude of the charging current and to create a variation pattern in the charging current based on the data.

In block 408, the charger 202 receives the data. More specifically, a sensor 212 in the charger 202 senses the charging current. A receiving unit 221 in the charger 202 receives and detects the variation pattern in the charging current and compares the variation pattern with pre-defined patterns to retrieve the data.

In block 410, a charger controller 208 in the charger 202 controls the charger 202 based on the data.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery pack operable for receiving a charging current from a charger via a power line, said battery pack comprising:
   a battery management unit, coupled to a plurality of battery cells, operable for acquiring data associated with said battery pack; and
   a transmitting unit, coupled to said battery management unit, operable for transmitting said data to said charger via said power line by varying an amplitude of said charging current, wherein said transmitting unit, comprises:
   a switch coupled to said power line, wherein said switch is controlled by a control signal to vary said amplitude of said charging current, wherein said control signal is generated based on said data.

2. The battery pack of claim 1, further comprising:
   a signal generator, coupled to said transmitting unit, operable for generating a control signal based on said data to control said transmitting unit, wherein said charging current increases if said control signal is in a first state, and wherein said charging current decreases if said control signal is in a second state.

3. The battery pack of claim 1, wherein said charging current increases if said switch is in a first state, wherein said charging current decreases if said switch is in a second state.

4. The battery pack of claim 3, wherein a current is enabled to flow from said power line through said switch if said switch is in said first state, wherein said current is disabled if said switch is in said second state.

5. The battery pack of claim 1, wherein said transmitting unit is operable for varying said amplitude of said charging current to create variation patterns in said charging current, wherein said data is embodied in said variation patterns in said charging current.

* * * * *